Feb. 6, 1940.　　　　J. WEGNER　　　2,189,573
RIVETING TOOL
Filed July 28, 1939　　2 Sheets-Sheet 1
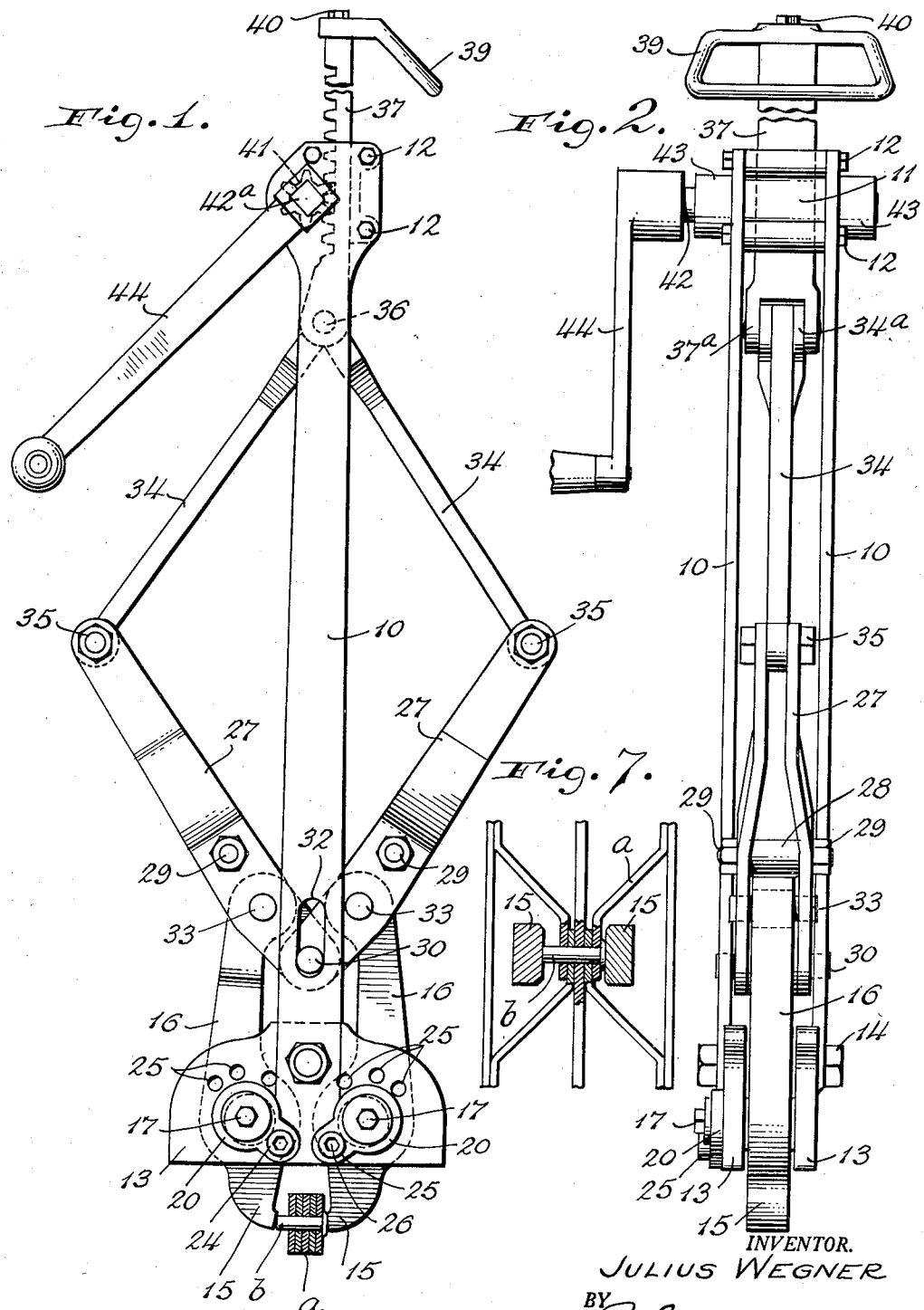
INVENTOR.
JULIUS WEGNER
BY
ATTORNEY

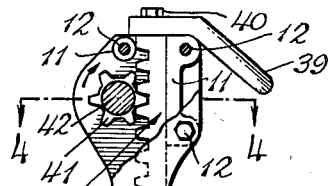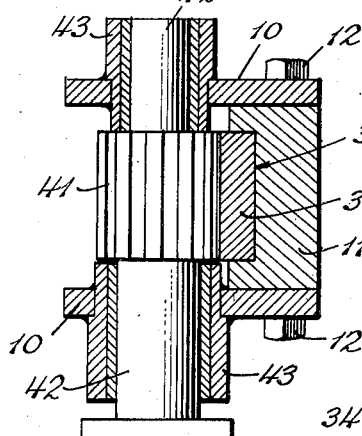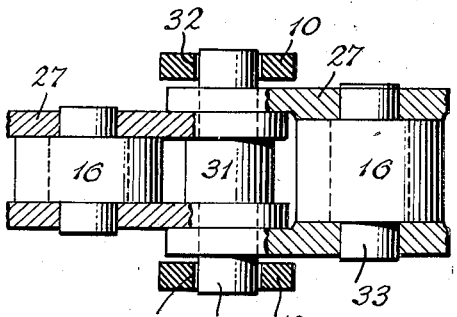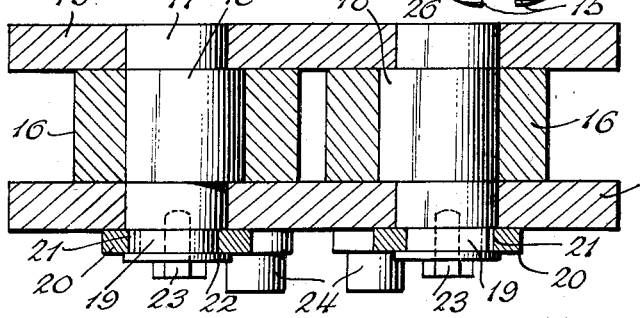

Patented Feb. 6, 1940

2,189,573

UNITED STATES PATENT OFFICE 2,189,573

RIVETING TOOL

Julius Wegner, Flushing, N. Y.

Application July 28, 1939, Serial No. 287,041

2 Claims. (Cl. 78—48)

The invention relates to riveting tools and has for its object to provide an easily portable tool of novel construction requiring no particular skill in its operation. The invention contemplates primarily the provision of a novel tool capable of being manually operated with a minimum of effort to develop a riveting force of high power ratio relatively to the manual operating force whereby the ends of the rivets are spread to form the second head thereon and said rivets are securely pressed in place. Other more specific objects will appear from the description hereinafter and the features of novelty will be pointed out in the claims.

In the accompanying drawings, which illustrate an example of the invention without defining its limits, Fig. 1 is a front elevation of the novel tool with the parts in normal position; Fig. 2 is a side elevation thereof; Fig. 3 is a front elevation with the parts in operative position; Fig. 4 is an enlarged section on the line 4—4 of Fig. 3; Fig. 5 is a similar view on the line 5—5 of Fig. 3; Fig. 6 is an enlarged section on the line 6—6 of Fig. 3; and Fig. 7 is a fragmentary detail view illustrating the tool in use.

The novel tool comprises a supporting means consisting of parallel members 10 fixed in spaced relation by means of a plate 11 provided with apertures for the accommodation of spacer bolts 12, said supporting means further including end plates 13 fastened to said members 10 by means of a bolt 14 which extends through a conventional spacer whereby said end plates 13 are maintained in spaced surface parallelism; in the preferred arrangement the end plates 13 are recessed for the accommodation of the ends of the members 10, as shown in Figs. 1 and 2.

The tool further includes cooperating jaws 15 forming part of or carried by arms 16 pivotally mounted in opposed relation between the plates 13 by means of pivot pins 17. To enable the jaws 15 to be adjusted toward and away from each other at will the pivot pins 17 carry eccentrics or cams 18 which constitute bearings for said arms 16; with this arrangement it is obvious that the jaws 15 will be shifted relatively to each other to different set positions as the eccentrics or cams 18 are rotated about the axes of the pivot pins 17. The latter are extended at one end beyond one plate 13 in the form of reduced necks 19 on which operating fingers or members 20 are mounted by means of keys 21 or the like, as illustrated in Fig. 3, and fastened against displacement thereon by washers 22 and screws 23. The operating fingers or members 20 are movable over and in contact with the outer surface of the one plate 13 and carry fastening means whereby the operating fingers 20 are locked in adjusted positions to thereby correspondingly fix the eccentrics or cams 18 and consequently the jaws 15 in the set positions to which they have been shifted by the aforesaid operations. In the illustrated example, the above-mentioned fastening means consists of screws 24 arranged to be screwed into threaded apertures 25 with which said plate 13 is provided, said apertures 25, in the number desired, being located in spaced relation in arcs having the axes of the pivot pins 17 as centers as shown in Figs. 2 and 3; the screws 24, as illustrated, may have heads provided with angular recesses 26 for the accommodation of a suitable tool whereby the manipulation of said screws 24 is facilitated.

In addition, the tool is provided with operating means whereby the jaws 15 are operated to exert a pressure upon the ends of rivets to spread the same in a manner to form second heads thereon and so as to securely press said rivets into place; the aforesaid operating means is constructed and arranged to develop a high power ratio in said jaws 15 with a minimum of manual effort on the part of the operator whereby the latter may operate the tool efficiently over comparatively long periods without material physical fatigue. The operating means, in its illustrated form, comprises a compound toggle arrangement or system consisting of toggle levers 27 each composed of associated parallel members secured together in spaced relation by means of spacers 28 and spacer bolts 29. The levers 27 at one end are in overlapping engagement and pivotally connected by means of a pin 30 and a spacer 31, the pin 30 extending outwardly beyond the toggle levers 27 in opposite directions and projecting into slots 32 formed in the members 10 in registry with each other as shown in Figs. 1, 3, and 5. The arms 16 of the jaws 15 are respectively located between the members of the toggle levers 27 and are pivotally connected therewith by pivot pins 33, as illustrated in Figs. 1, 2, 3, and 5; with this construction the overlapping end portions of the toggle levers 27 between the pin 30 and the respective pivot pins 33 constitute one section of the previously mentioned compound toggle arrangement or system.

The operating means further includes toggle links 34 which are pivotally connected at 35 with the toggle levers 27, said links 34 extending between the associated members of the levers 27 and serving to space the latter apart in the intended relation; said links 34 and those parts of the toggle links 27 located between the respective pivot pins 33 and the respective pivots 35 constitute the other section of the compound toggle arrangement or system referred to hereinbefore. The links 34 are further pivotally connected at 36 with each other and with one end of an operating rack 37; as shown in Fig. 2, the one link 34 projects into the forked end 34a of the other link 34, with the associated ends of both links 34 extending into the forked end 37a of the rack 37. The latter is located between the parallel members 10 of the supporting means and is slidably guided in a guide groove 38, said rack 37 extending lengthwise of the members 10 and being provided at its free end with a handle 39 fastened in place by a screw 40 as illustrated in Figs. 1, 2, and 3. The rack 37 meshes with a pinion 41 carried by journals 42 rotatably mounted in bearings 43 suitably supported and fixed on the members 10 as shown in Fig. 4; one of the journals 42 extends outwardly beyond the associated bearing 43 and is provided with a squared end 42a on which an operating crank 44 is fastened as illustrated in Figs. 1, 2, and 4.

The novel tool is specially designed for certain type of work in which the rivets are in locations not accessible to other forms of riveters; an example of such work is shown in Fig. 7 which illustrates a grid $a$ the parts of which are secured together by rivets $b$. The latter in many instances are located so as not to be readily accessible for example as illustrated in Fig. 7.

In utilizing the tool, the jaws 15 are first adjusted or set for the particular length of rivets $b$ to be operated on at the time, to so space said jaws as to avoid any lost motion or unnecessary movements in the actual pressing of said rivets into place. This adjustment is accomplished by first unscrewing the screws 24 from given apertures 25, then moving the operating fingers 20 in circular arcs over the one plate 13 to thereby rotate the eccentrics 18 and shift the arms 16 either toward or away from each other as the case may be, to thereby correspondingly shift the jaws 15 with respect to each other. The operation of the operating fingers 20 is continued until the screw openings thereof register with the threaded apertures 25 corresponding to the set position to which the jaws 15 are to be adjusted. The screws 24 are then screwed into these apertures 25 to fix the fingers 20 and their associated elements in the adjusted positions. It will be understood that the aforesaid setting operations will be unnecessary if the jaws 15 at the time are properly set to accommodate the particular rivets $b$ when the parts of the tool occupy the positions illustrated in Fig. 1. After a rivet $b$ having the customary head at one end thereof has been placed in position, for instance, as shown in Fig. 7, the tool is manipulated to bring the jaws 15 over and into contact with the headed and unheaded ends respectively of said rivet $b$ in the manner illustrated in Fig. 7. The crank handle 44 is then operated to rotate the journals 42 in the bearings 43 and to correspondingly rotate the pinion 41 which transmits its motion to the rack 37; the direction of rotation of the pinion 41 by means of the crank handle 44 is such that the rack 37 will be shifted lengthwise of the members 10 to move the pivot pin 36 toward the jaws 15. This operation initially will shift the pin 30 from the one end of the slot 32 shown in Fig. 1 lengthwise of said slot toward the other end thereof. The one section of the compound toggle arrangement or system will thereby exert an outward pressure in opposite directions on the pins 33 to move the associated ends of the arms 16 away from each other and thereby rock said arms 16 on the eccentrics 18 whereby the jaws 15 are shifted toward each other. This causes the one jaw 15 to develop a preliminary pressure upon the unheaded end of the rivet $b$ which pressure is resisted by the other jaw 15 in contact with the headed end of said rivet $b$. As the rotation of the pinion 41 by means of the crank handle continues, the lengthwise movement of the rack 37 will be correspondingly continued to cause the toggle links 34 to spread the outer ends of the toggle levers 27 and to finally bring the parts to the position illustrated in Fig. 3 in which the pin 30 is located at the upper end of the slot 32 in said figure. In these final stages of the aforesaid operations the second section of the compound toggle arrangement or system will pivotally actuate the arms 16 on the eccentrics 18 to thereby cause the one jaw 15 to develop a progressively increasing pressure on the normally unheaded end of the rivet $b$, which increased pressure is resisted by the other jaw 15 in engagement with the headed end of said rivet $b$. This increased pressure developed by the one jaw 15 is sufficient to spread the normally unheaded end of the rivet $b$ and to form a second head on said rivet, and to firmly and securely compress the rivet $b$ into its intended riveting position, for instance, to secure the parts of the grid $a$ together as illustrated in Fig. 7. The compound toggle arrangement in association with the operating means causes the manual power exerted by the operator to operate the crank handle 44 and the pinion 41 to be greatly multiplied in the jaws 15. In other words, the combination of the compound toggle arrangement in connection with the manually operated crank handle 44, pinion 41 and rack 37 constitutes a mechanical arrangement by which an extremely high power ratio is developed in the jaws 15 relatively to manual power exerted; as a result the operator is able to manipulate this tool over comparatively long periods without material physical fatigue and to develop the pressure necessary to compress the rivet $b$ and form the second head thereof in an efficient and reliable manner. During the manipulation of the tool, it may readily be held in position relatively to the particular rivet $b$ by means of the handle 39, as will be apparent.

The arrangement and construction of the tool is such that it may be easily utilized on rivets which are located in more or less inaccessible positions and on which other types of riveting devices cannot be used. The novel tool is simple in construction and requires no particular skill in its operation, and in addition to being available for use on rivets which are difficult of access, may be used with equal efficiency on all types of riveting within its operative range.

Various changes in the specific forms shown and described may be made within the scope of the claims without departing from the spirit of the invention.

I claim:

1. A riveting tool comprising supporting means consisting of spaced parallel members provided with registering slots, and spaced parallel plates carried by said members at one end, eccentrics located between said plates, pivot pins whereby said eccentrics are rotatably mounted between said plates, arms pivotally mounted on said eccentrics, jaws carried by said arms for developing compressive pressures on the rivets, means for rotating said eccentrics to thereby adjust said jaws relatively to each other to different set positions, toggle levers pivotally connected with said arms at intermediate points of said levers, a pin pivotally connecting said toggle levers together at one end and projecting into the slots of said parallel members, toggle links pivotally connected with said toggle levers at the opposite ends thereof, a rack located between said parallel members, a pivot pin pivotally connecting said toggle links with each other and with said rack, a pinion journalled between said parallel members in mesh with said rack, and a crank handle for rotating said pinion to thereby operate said rack lengthwise of said parallel members whereby said toggle links and toggle levers are actuated to pivotally operate said arms in a manner to cause said jaws to develop compressive pressure on the rivets and spread the normally unheaded ends thereof into second heads and to firmly compress said rivets in riveting positions.

2. A riveting tool comprising supporting means consisting of spaced parallel members provided with registering slots, and spaced parallel plates carried by said members at one end, eccentrics located between said plates, pivot pins whereby said eccentrics are rotatably mounted between said plates, arms pivotally mounted on said eccentrics, jaws carried by said arms for developing compressive pressures on the rivets, means for rotating said eccentrics to thereby adjust said jaws relatively to each other to different set positions, toggle levers pivotally connected with said arms at intermediate points of said levers, a pin pivotally connecting said toggle levers together at one end and projecting into the slots of said parallel members, toggle links pivotally connected with said toggle levers at the opposite ends thereof, a linearly movable member, a pivot pin pivotally connecting said toggle links with each other and with said linearly movable member, and manually operative rotatable means for linearly operating said last-named member whereby said toggle links and toggle levers are actuated to operate said arms in a manner to cause said jaws to develop compressive pressure on the rivets and spread the normally unheaded ends thereof into second heads and to firmly compress said rivets in riveting positions.

JULIUS WEGNER.